(12) United States Patent
Dake

(10) Patent No.: US 12,373,141 B2
(45) Date of Patent: Jul. 29, 2025

(54) COMMAND TABLE GENERATOR FOR A MEMORY DEVICE

(71) Applicant: Micron Technology, Inc., Boise, ID (US)

(72) Inventor: Dheeraj Dake, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 18/535,650

(22) Filed: Dec. 11, 2023

(65) Prior Publication Data

US 2024/0201905 A1 Jun. 20, 2024

(30) Foreign Application Priority Data

Dec. 16, 2022 (IN) .............................. 202241072872

(51) Int. Cl.
G06F 3/06 (2006.01)
(52) U.S. Cl.
CPC .......... G06F 3/0659 (2013.01); G06F 3/0613 (2013.01); G06F 3/0679 (2013.01)
(58) Field of Classification Search
CPC ..... G06F 3/0659; G06F 3/0613; G06F 3/0679
See application file for complete search history.

(56) References Cited

U.S. PATENT DOCUMENTS

| 2009/0262447 A1* | 10/2009 | Inoue | G06F 3/0611 |
| | | | 360/39 |
| 2017/0116139 A1* | 4/2017 | Mcvay | G06F 13/1668 |
| 2021/0200472 A1* | 7/2021 | Gaddam | G06F 3/0679 |

OTHER PUBLICATIONS

Borello, Gabriele. Towards Computational Storage. Diss. Politecnico di Torino, 2021. (Year: 2021).*

* cited by examiner

*Primary Examiner* — Nicholas J Simonetti
(74) *Attorney, Agent, or Firm* — Harrity & Harrity, LLP

(57) ABSTRACT

In some implementations, a device may obtain a command table associated with a memory device, wherein the command table includes one or more entries associated with one or more respective commands, and wherein each entry, from the one or more entries, includes one or more units of data. The device may receive an indication of a modification associated with a first command, wherein the first command indicates a sequence of a first one or more units of data. The device may modify the command table based on the modification associated with the first command, wherein modifying the command table includes at least one of: adding an entry, that indicates the sequence, to the one or more entries to indicate the first command, or removing the entry from the one or more entries. The device may provide, to a controller of the memory device, an indication of the command table.

20 Claims, 9 Drawing Sheets

COMMAND TABLE GENERATOR FOR A MEMORY DEVICE

CROSS-REFERENCE TO RELATED APPLICATION

This Patent Applications claims priority to India Provisional Patent Application No. 202241072872, filed on Dec. 16, 2022, entitled "COMMAND TABLE GENERATOR FOR A MEMORY DEVICE," and assigned to the assignee hereof. The disclosure of the prior Application is considered part of and is incorporated by reference into this Patent Application.

TECHNICAL FIELD

The present disclosure generally relates to memory devices, memory device operations, and, for example, to a command table generator for a memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
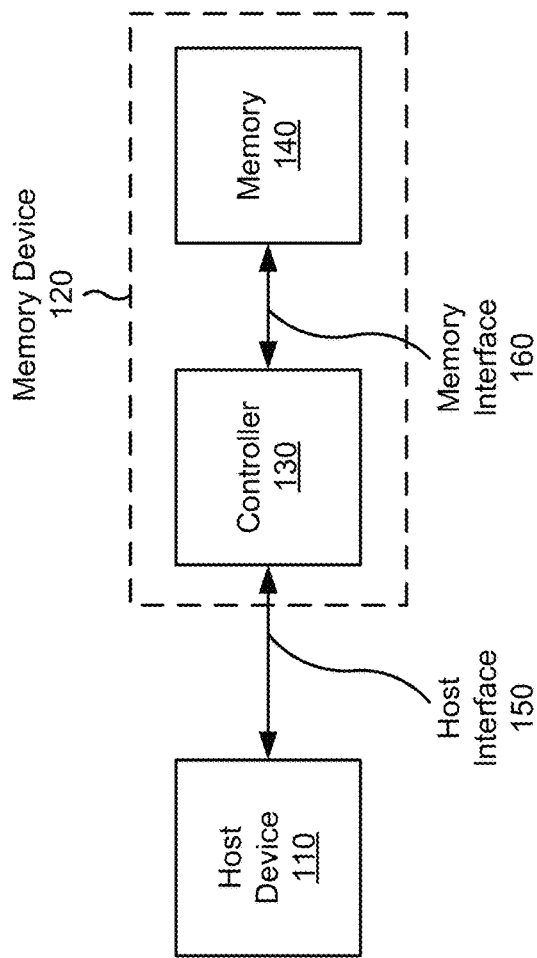
FIG. 1 is a diagram illustrating an example system capable of generating and/or storing a command table for a memory device.

A memory device may be capable of performing one or more commands. For example, the memory device may receive a command from a host device. A controller of the memory device may identify the command and may cause the memory device to perform one or more operations associated with the command. The command may include a read command (e.g., a page read command, a random data read command, and/or a read status command), a write command, an erase command, a device reset command, a read mode command, and/or a device initialization command, among other examples. The memory device may be configured with the one or more commands. For example, the memory device may be configured with a command table. The command table may indicate information associated with respective commands. For example, the memory device may store the command table (e.g., in a memory of the memory device).

For example, a controller of the memory device may validate and/or identify one or more commands using the command table. For example, the controller of the memory device may validate commands obtained from a host device. For example, the controller may receive an offset value indicating a location in the command table associated with the command. The controller may validate that the offset value is associated with a valid command and may obtain information associated with the command from the command table (e.g., a sequence of operations to be performed for the command).

For example, a given command may include one or more sequences. Each sequence may be defined by a unit of data, such as an unsigned integer value having a given size. As an example, a unit of data may include a double word (DWORD). A DWORD may be a 32-bit unit of data (e.g., a 32-bit unsigned integer). After receiving a command, the controller of the memory device may obtain each sequence associated with the command by reading the units of data (e.g., the DWORDs) associated with the sequence(s) of the command from the command table. However, a memory device may be configured with a large number of commands. For example, thousands of sequences may be configured for the memory device (e.g., the memory device may be capable of performing thousands of sequences). Each sequence may be defined by one or more units of data (e.g., one or more DWORDs). Therefore, the command table may consume significant memory resources of the memory device (e.g., to store information associated with each command and/or each sequence configured for the memory device).

In some cases, two or more commands may share common sequences. For example, a first command may include a sequence of "ABCD" and a second command may include a sequence of "BCD" (e.g., where each letter represents a unit of data, such as a DWORD). Therefore, storing data for both "ABCD" and "BCD" in the command table may needlessly consume memory resources because "BCD" is stored in the command table twice. Therefore, the command table may include an array of sequences, where each command is defined by an offset value (e.g., an index value) and a length in the array. For example, assuming the command table includes the two commands above, the array may include "ABCD." The first command may be associated with an index value of "0" (e.g., pointing to "A") and a length of four (e.g., indicating that the first command includes the sequence of "ABCD"). The second command may be associated with an index value of "1" (e.g., pointing to "B") and a length of three (e.g., indicating that the second command includes the sequence of "BCD"). This may conserve memory resources of the memory device by reducing a size of the command table.

However, because the command table may include thousands of commands and/or sequences, maintaining the command table in this manner may introduce additional complexities. For example, the command table may be maintained in a table and/or spreadsheet format. Therefore, when a new command is added to the command table, it may be difficult to identify commands and/or sequences having common units of data with the new command. Moreover, because multiple commands may be interdependent (e.g., may be defined using the same units of data in the command table), modifying, adding, and/or removing a command in the command table may impact other commands. As a result, a size of the command table may be increased (e.g., because other commands sharing common sequences and/or units of data of a new command may not be recognized or identified), thereby consuming memory resources of the memory device associated with storing a larger command table. Additionally, or alternatively, a modification to the command table may cause information associated with one or more commands to be inadvertently removed (e.g., in the example above, if the first command ("ABCD") is removed from the command table, information associated with the second command ("BCD") may also be removed). This may result in the memory device being unable to perform a valid command because the command table does not include information (e.g., one or more sequences) associated with the command.

Some implementations described herein enable a command table generator for a memory device. For example, a device (e.g., a command table generator) may obtain a command table associated with the memory device. The command table may include one or more entries associated with one or more respective commands. In some implementations, each entry, from the one or more entries, includes one or more units of data. For example, the command table includes an array of units of data (e.g., DWORDs) and the command table may indicate one or more commands via respective sequences of one or more units of data from the units of data. The device may receive an indication of a modification associated with a first command. The first command may indicate a sequence of a first one or more units of data. The device may modify the command table based on the modification associated with the first command. The device may provide, to a controller of the memory device, the command table after performing the modification.

For example, the device may add an entry, that indicates the sequence, to the one or more entries to indicate the first command. Adding the entry may include rearranging an order of the array of the units of data to a modified order that includes the first sequence and the respective sequences, identifying the first sequence in the array and storing an indication of an index value and length identifying the first sequence, and/or appending the first sequence to the command table (e.g., if the first sequence is not already included in the command table), among other examples. In other words, the device may modify an array associated with the command table to generate a smallest array that includes the respective sequences and the first sequence (e.g., a smallest array of data units that includes sequences for all commands configured in the command table).

As another example, the device may remove an entry from the one or more entries associated with the first command. For example, the device may determine whether the sequence of the first one or more units of data is included in a sequence of any other command indicated by the command table. The device may remove the first one or more units of data from the command table based on determining that the sequence is not included in the sequence of any other command indicated by the command table. Alternatively, the device may refrain from removing the first one or more units of data from the command table based on determining that the sequence is included in the sequence of any other command indicated by the command table.

As a result, a size associated with the command table is reduced. For example, the device may ensure that the command table includes the smallest array of data units that includes sequences for all commands configured in the command table when a command is added or removed from the command table. This conserves memory resources associated with the memory device that would have otherwise been used to store a larger command table. Additionally, the device may ensure that interdependencies between commands are correctly handled when a command is added or removed from the command table and/or when a command is modified. For example, the device may ensure that sequences for all other commands are present in an array of data units after removing the command, adding the command, and/or rearranging the array, among other examples. This ensures that the memory device (e.g., the controller of the memory device) has access to information associated with all valid commands configured for the memory device. Further, this reduces a complexity that would have otherwise been associated with manual maintenance of the command table (e.g., in the table or spreadsheet format).

FIG. 1 is a diagram illustrating an example system 100 capable of generating and/or storing a command table for a memory device. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to obtain a command table associated with the memory device 120, wherein the command table includes an array of units of data, and wherein the command table indicates one or more commands via respective sequences of one or more units of data from the units of data; receive an indication of a first command to be added to the command table, wherein the first command indicates a first sequence of one or more units of data; modify the command table to cause the array of the units of data to include the first sequence, wherein modifying the command table includes at least one of: rearranging an order of the array of the units of data to a modified order that includes the first sequence and the respective sequences, identifying the first sequence in the array and storing an indication of an index value and length identifying the first sequence in the array, or appending the first sequence to the array; and provide, to a controller of the memory device, an indication of the command table.

In some implementations, the memory device 120 and/or the controller 130 may be configured to obtain a command table associated with the memory device 120, wherein the command table includes one or more entries associated with one or more respective commands, and wherein each entry, from the one or more entries, includes one or more units of data; receive an indication of a modification associated with a first command, wherein the first command indicates a sequence of a first one or more units of data; modify the command table based on the modification associated with the first command, wherein modifying the command table includes at least one of: adding an entry, that indicates the sequence, to the one or more entries to indicate the first command, or removing the entry from the one or more entries; and provide, to a controller of the memory device, an indication of the command table.

In some implementations, the memory device 120 and/or the controller 130 may be configured to obtain a command table associated with the memory device 120, wherein the command table includes an array of units of data, and wherein the command table indicates one or more commands via respective sequences of one or more units of data from the units of data; receive an indication of a first command to be added to the command table, wherein the first command indicates a first sequence of one or more units of data; and modify the command table to cause the array of the units of data to include the first sequence, wherein the means for modifying the command table includes at least one of: rearranging an order of the array of the units of data to a modified order that includes the first sequence and the respective sequences, identifying the first sequence in the array and storing an indication of an index value and length identifying the first sequence in the array, or appending the first sequence to the array.

As indicated above, FIG. 1 is provided as an example. Other examples may differ from what is described with regard to FIG. 1.

Figure 2:
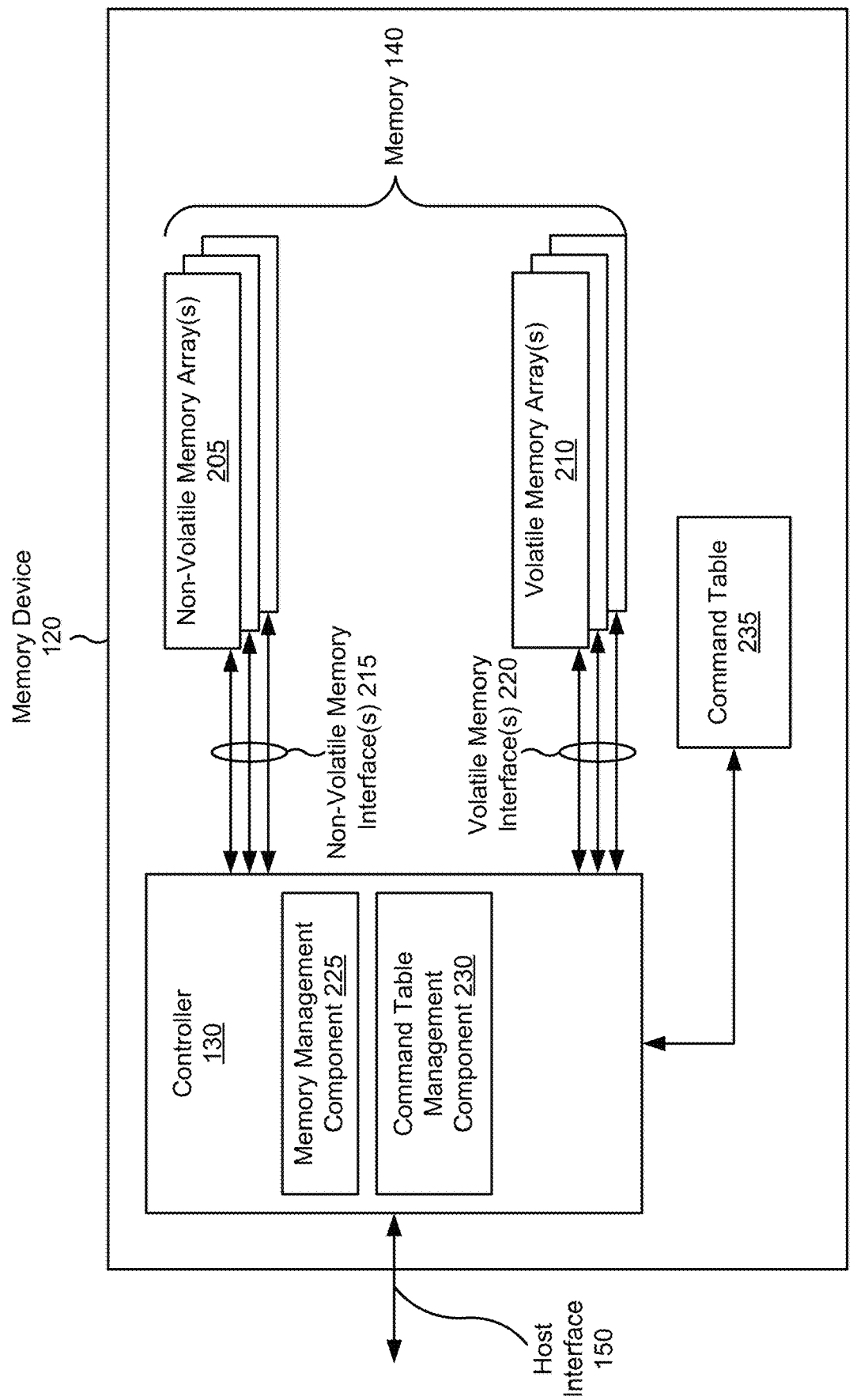
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a command table management component 230, and/or a command table 235. In some implementations, one or more of these components are implemented as one or more instructions (e.g., firmware) executed by the controller 130. Alternatively, one or more of these components may be implemented as dedicated integrated circuits distinct from the controller 130. In some implementations, the command table 235 may be stored in the memory 140.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The command table management component 230 may be configured to store, access, maintain, and/or modify the command table 235. For example, the command table management component 230 may be configured to obtain an offset (e.g., an index value and/or a length) associated with a command. The command table management component 230 may be configured to search and/or parse the command table 235 (e.g., using the index value and/or the length) to identify one or more sequences associated with the command. The command table management component 230 may be configured to cause the controller 130 and/or the memory device 120 to perform operations indicated by the one or more sequences associated with the command. In some implementations, the command table management component 230 may be configured to modify the command table as described elsewhere herein in more detail.

The command table 235 may store information associated with one or more commands. For example, for a given command, the command table 235 may store information associated with one or more sequences. For example, a sequence may be defined by information included in a unit of data. The command table 235 may include an array of units of data. The command table 235 may be arranged such that different commands reference the same unit of data when the different commands include the same sequence (e.g., that is defined by the same unit of data) to reduce a size of the command table 235. In some implementations, the command table 235 may be configured for the memory device 120.

One or more devices or components shown in FIG. 2 may be configured to perform operations described herein, such as one or more operations and/or methods described in connection with FIGS. 3A, 3B, and 4-8. For example, the controller 130, the memory management component 225, command table management component 230, and/or the command table 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3A:
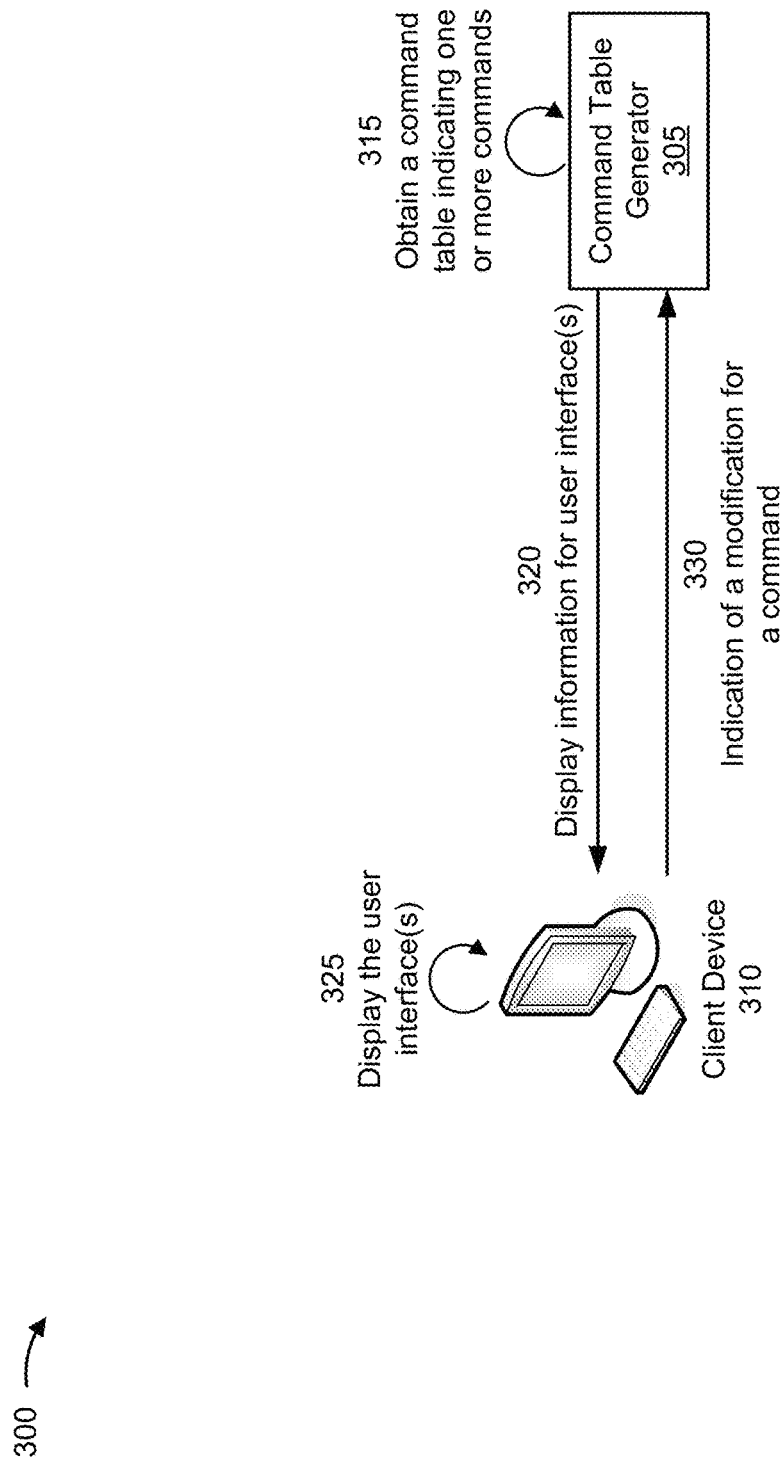
FIGS. 3A and 3B are diagrams of an example of a command table generator for a memory device.
Figure 3B:
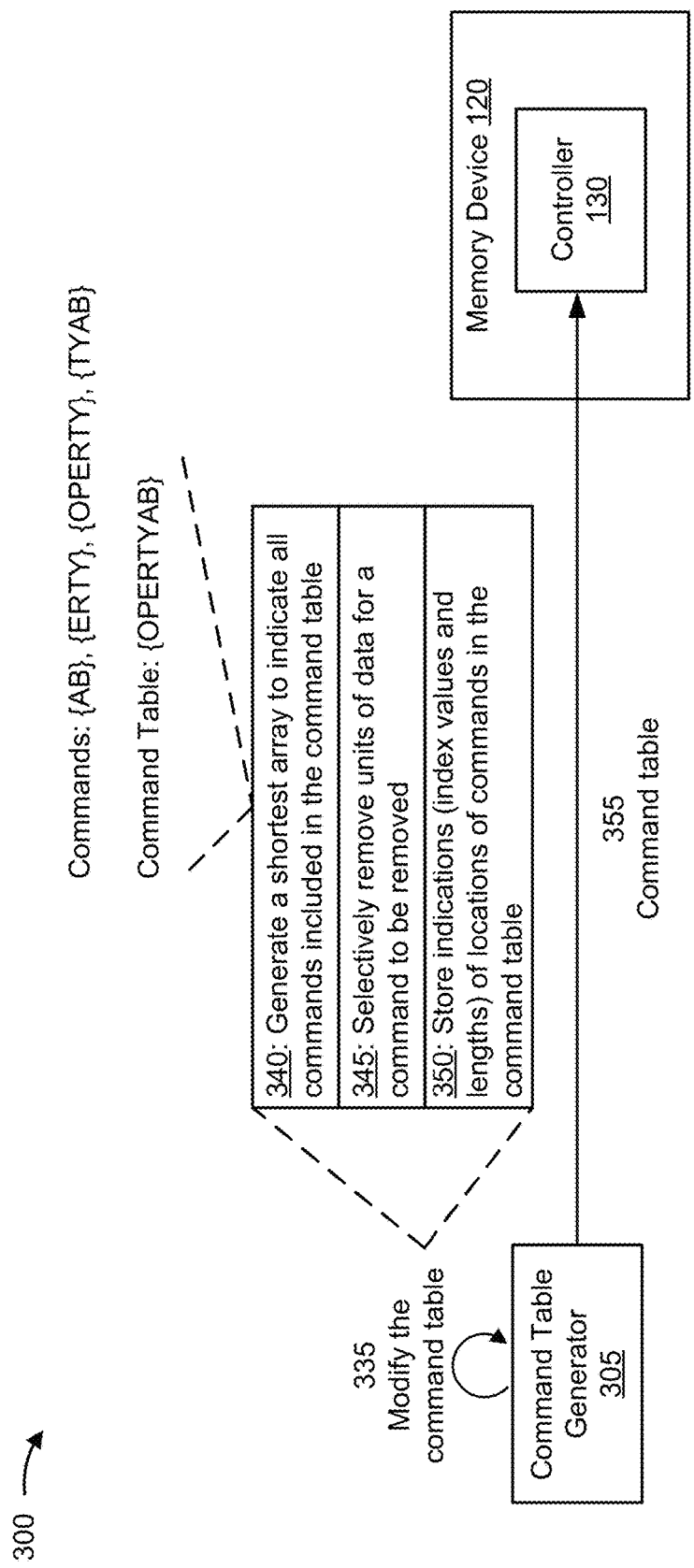

FIGS. 3A and 3B are diagrams of an example 300 of a command table generator for a memory device. As shown in FIGS. 3A and 3B, the example 300 may include a command table generator 305, a client device 310, and the memory device 120. The command table generator 305 and the client device 310 are described in more detail in connection with FIGS. 4 and 5. Additionally, or alternatively, the operations described in connection with FIGS. 3A and 3B may be performed by the memory device 120 and/or one or more components of the memory device 120, such as the controller 130 and/or one or more components of the controller 130.

The command table generator 305 may be associated with a platform used to develop, maintain, create, generate, and/or modify a command table of the memory device 120 (e.g., the command table 235). For example, the command table generator 305 may include one or more instructions, that when executed by the command table generator 305, cause the command table generator 305 to generate a smallest array of units of data (e.g., a smallest array of DWORDs) that includes sequences for all commands configured for the memory device 120 (e.g., configured to be included in the command table), as described in more detail elsewhere herein.

As shown in FIG. 3A, and by reference number 315, the command table generator 305 may obtain the command table. In some implementations, the command table generator 305 may obtain the command table from the client device 310. As another example, the command table generator 305 may obtain the command table from the memory device 120. In some implementations, the command table generator 305 may store the command table. For example, the command table generator 305 may maintain an active or current version of the command table in a memory. The command table generator 305 may obtain the command table from the memory.

The command table may indicate one or more commands. For example, the command table may include one or more entries, where each entry is associated with a command. For example, an entry may be defined by an index value and a length (or size) in an array. For example, the command table may include an array of units of data (e.g., an array of DWORDs) arranged in an order. An entry for a command may include an index value of the array pointing to a starting unit of data associated with a sequence of the command. The entry may include a length or size indicating a quantity of units of data (e.g., including the unit of data indicated by the index value) that are associated with the command. For example, if the array includes units of data "ABCDEFG" and the entry includes an index value of 2 and a length of 3, then the command may include the sequence "CDE" (e.g., assuming the index values start at a value of 0, starting with "A"), where C is a first unit of data, D is a second unit of data, and E is a third unit of data. For example, the first unit of data, the second unit of data, and the third unit of data may define one or more sequences and/or operations to be performed by the memory device 120 associated with the command.

In some implementations, the command table generator 305 may generate a user interface to enable a user (e.g., a developer) to view, access, and/or modify information stored by the command table. For example, the command table generator 305 may use a programming language that uses non-binary file formats, such as Java, to enable easier comparisons across versions of the command table. For example, binary files, such as a spreadsheet file or an Excel Open Macro-Enabled Spreadsheet (XLSM) file, may be difficult to compare across different versions of a file because platforms and/or tools used to compare the different files may be unable to process or compile binary files. Therefore, the command table generator 305 may store instructions that are associated with a programming language that uses non-binary file formats, such as Python and/or Java, among other examples. However, the programming language used by the command table generator 305 may be difficult to read and/or understand by a human. Additionally, the programming language used by the command table generator 305 may be different than a programming language used the controller 130 and/or the memory device 120 (e.g., that is used to store instructions in a firmware component of the memory device 120). Therefore, the command table generator may convert information to different programming languages and/or formats for display via one or more user interfaces.

For example, the command table generator 305 may generate display information associated with a user interface by converting information associated with the command table from a first format associated with modifying the command table to a second format associated with the user interface. For example, the first format may include a Python programming language format. The second format may include a plain text format, such as a comma-separated values (CSV) format, among other examples. For example, the second format may include a format that is capable of being displayed in a spreadsheet or table. For example, the command table generator 305 may generate display information associated with a user interface to cause information stored in the command table to be provided in the second format (e.g., in the CSV format). In some implementations, the file associated with the user interface (e.g., the CSV format file) may be a read-only file (e.g., may allow data to be accessed, but may not allow the data to be modified).

This may enable the user interface to display the information in a spreadsheet or table format, thereby increasing the ability of a user (e.g., a developer) to read and/or understand the information. This may improve access to the data stored in the command table and/or improve a user experience associated with accessing and/or modifying the information stored by the command table. This may also enable the command table generator 305 to modify, manage, and/or maintain the command table using instructions written in the first programming language, which may reduce a complexity associated with modifying, managing, and/or maintaining the command table.

Additionally, the command table generator 305 may generate display information associated with a user interface that includes one or more input options for modifying the command table. For example, an input option may include a field for inputting one or more sequences of a command. For example, different sequences and/or operations may be defined for operations that one or more hardware components of the memory device 120 are capable of performing. An input option may include one or more fields in which a user can input data associated with a command, such as one or more sequences associated with the command. In some implementations, the user interface may include an input option for inputting a logical command that includes multiple commands defined for the memory device 120. For example, a field in the user interface may enable a pointer or indicator to be input that indicates a command from a command database (e.g., a dictionary including possible commands to be configured for the memory device 120).

In some implementations, an input in the user interface may include a repeat field or a repetition field. The repeat field or the repetition field may enable a user to indicate a quantity of repetitions to be associated with a given command (e.g., indicating that the memory device 120 is to perform the command N times, where N is input to the repeat field or the repetition field). This may conserve time, computing resources, network resources, and/or memory resources, among other examples, that would have otherwise been associated with data associated with the command being input and transmitted to the command table generator 305 N times. Rather, the command may be input and transmitted to the command table generator 305 once with an indication of the value of N. The command table generator 305 may identify that the command is to be repeated N times in the command table.

In some implementations, a user interface generated by the command table generator 305 may enable command data or information to be input using a programming language that is used by a firmware component of the controller 130 of the memory device 120. For example, the user interface may enable a user to input information using names, definitions, and/or structures associated with the programming language that is used by the firmware component. The command table generator 305 may store a database and/or a table that enables the command table generator 305 to extract and/or convert information from the programming language that is used by the firmware component. For example, the command table generator 305 may store data structures and/or information to enable the command table generator 305 to extract and/or identify information that is indicated using names, definitions, and/or structures associated with the programming language that is used by the firmware component.

In some implementations, a user interface generated by the command table generator 305 may enable modifications associated with the command table to be input using binary data and/or hexadecimal data, among other examples. For example, as described elsewhere herein, the command table generator 305 may use non-binary file formats to improve the ability to compare different versions of the command table. However, developers and/or users may indicate information associated with commands (e.g., a sequence) using binary data. Therefore, the user interface generated by the command table generator 305 may enable modifications associated with the command table to be input using binary data and/or hexadecimal data, among other examples.

In some implementations, a user interface generated by the command table generator 305 may enable command data or information to be input using differential information. For example, differential information may include an indication of information that is different than another command or entry in the command table. For example, the differential information may indicate different information between a first command and a second command associated with the command table. This may enable less information to be input to the user interface to indicate a modification to the command table. This may conserve time, computing resources, network resources, and/or memory resources, among other examples, that would have otherwise been associated with inputting all information for each command (e.g., even when most of the information has already been input and/or stored in the command table for another command).

As shown by reference number 320, the command table generator 305 may transmit, and the client device 310 may receive, display information for one or more user interfaces. For example, the display information may include information that, when executed by the client device 310, causes the client device to display the one or more user interfaces described above. For example, as shown by reference number 325, the client device 310 may display the one or more user interfaces. The user interface(s) may enable a user of the client device to view, access, update, and/or modify information stored in the command table. For example, the client device 310 may obtain, via a user input to a user interface displayed by the client device 310, an indication of a modification to the command table. For example, the modification may include an addition of a command to be stored in the command table, a removal (or deletion) of a command from the command table, and/or a modification of a command stored in the command table, among other examples.

As shown by reference number 330, the client device 310 may transmit, and the command table generator 305 may receive, an indication of a modification associated with a command. For example, the client device 310 may transmit, and the command table generator 305 may receive, an indication of a command to be added to the command table. As another example, the client device 310 may transmit, and the command table generator 305 may receive, an indication of a command to be removed from the command table. As another example, the client device 310 may transmit, and the command table generator 305 may receive, an indication of a modification of information associated with a command stored in the command table.

In some implementations, the command table generator 305 may receive an indication of a quantity of repetitions associated with a sequence that are to be included in the command. For example, the client device 310 may transmit, and the command table generator 305 may receive, an indication of a sequence associated with the command and a quantity of repetitions to be associated with the sequence (e.g., via information input to a repeat field or a repetition field of a user interface, as described in more detail elsewhere herein). The command table generator may modify the command table and/or an array of the command table to include the quantity of repetitions of units of data (e.g., DWORDs) corresponding to the sequence, as described in more detail elsewhere herein.

In some implementations, the command table generator 305 may receive the indication of the modification in a first programming language that is used by the firmware component of the controller 130 of the memory device 120. The command table generator 305 may extract information from the indication of the modification in the first programming language. For example, the command table generator 305 may use one or more data structures to extract information for operations or commands (e.g., that are indicated using a first programming language that is used by the firmware component), such as header information that would not otherwise be processed or compiled by a second programming language used by the command table generator 305. The command table generator 305 may convert the information into the second programming language that is used by the command table generator 305 to modify the command table. This may enable the information associated with the modification to be input using names, definitions, and/or formats that are associated with the first programming language that is used by the firmware component (e.g., which may be more familiar to developers and/or users associated with the firmware component). Additionally, this may enable the command table generator 305 to obtain information from the names, definitions, and/or formats that are associated with the first programming language that would otherwise be lost if the command table generator 305 attempted to process and/or compile the information using the second programming language.

In some implementations, the command table generator 305 may receive an indication of differential information indicating the modification associated with the command. For example, the differential information may indicate different information between a first command (e.g., indicated by the modification) and a second command associated with the command table. The command table generator 305 may obtain the information associated with the second command from the command table. The command table generator 305 may modify the information associated with the second command based on the differential information to obtain the information associated with the first command (e.g., the command associated with the modification).

As shown in FIG. 3B, and by reference number 335, the command table generator 305 may modify the command table based on the indication of the modification received from the client device 310. For example, the indication of the modification may include an indication of a command. The command table generator 305 may determine a sequence associated with the command based on the information provided by the client device 310. For example, the sequence may include a sequence of units of data (e.g., a sequence of DWORDs). For example, the sequence may include "DEF" where D is a first unit of data (e.g., a first DWORD), E is a second unit of data (e.g., a second DWORD), and F is a third unit of data (e.g., a third DWORD).

For example, the modification may include adding the command to the command table. The command table generator 305 may add an entry, that indicates the sequence, to the one or more entries (included in the command table) to indicate the command. For example, as shown by reference number 340, the command table generate 305 may generate a shortest array of units of data (e.g., a shortest or smallest array of DWORDs) to indicate all commands to be included in the command table.

For example, as shown in FIG. 3B, commands to be included in the command table may include command sequences of "AB," "ERTY," "OPERTY," and "TYAB." The command table generator 305 may identify overlapping or common units of data (e.g., common DWORDs) among the command sequences of the commands to be included in the command table. The command table generator 305 may determine whether any command sequences are included in another command sequence. For example, the command table generator 305 may identify that the sequence of "ERTY" is included in the sequence of "OPERTY." Therefore, the command table generator 305 may determine that the sequence of "ERTY" does not need to be included separately in the command table. As another example, the command table generator 305 may identify that the sequence of "AB" is included in the sequence of "TYAB." Therefore, the command table generator 305 may determine that the sequence of "AB" does not need to be included separately in the command table.

The command table generator 305 may determine any overlapping sequences or units of data among sequences to be included in the command table. For example, the command table generator 305 may determine that the sequence of "OPERTY" and the sequence "TYAB" both include the units of data of "TY." The command table generator 305 may determine whether the sequences can be arranged such that the overlapping sequences or units of data is included only once in the command table. For example, the command table generator 305 may determine that by arranging the sequence of "OPERTY" before the sequence "TYAB" in the array of the command table, the units of data of "TY" may only be included once in the command table. Therefore, the command table generator 305 may determine that the shortest array for the command sequences of "AB," "ERTY," "OPERTY," and "TYAB" is "OPERTYAB." For example, each unit of data in the array may be associated with an index value. For example, a command for the command sequence of "AB" may be associated with an index value of 6 and a length of 2 (e.g., indicating that the command sequence begins at the unit of data associated with the index value of 6 (e.g., "A") and includes 2 units of data). As another example, the command for the command sequence of "ERTY" may be associated with an index value of 2 and a length of 4 (e.g., indicating that the command sequence begins at the unit of data associated with the index value of 2 (e.g., "E") and includes 4 units of data).

In some implementations, the command table generator 305 may identify the sequence, of a command to be added to the command table, in the array. The command table generator 305 may store an indication of an index value and length identifying the sequence in the array. In other words, if the sequence already exists in the command table, then the command table generator 305 may not perform any actions to modify the array of the command table. Rather, the command table generator 305 may generate the entry associated with the command by storing the index value and length identifying a location of the sequence in the array.

Additionally, the command table generator 305 may determine whether a combination of multiple command sequences can be used to represent another command sequence. For example, commands to be included in the command table may include command sequences of "AB," "CD," and "BC." The command table generator 305 may determine that the sequence of "BC" can be represented by a combination of the sequences of "AB" and "CD." Therefore, the command table generator 305 may arrange the sequences of "AB" and "CD" in the command table as "ABCD" such that 4 units of data can represent the command sequences of "AB," "CD," and "BC" (e.g., rather than 6 units of data).

For example, the command table (e.g., as obtained by the command table generator 305 as described in connection with reference number 315) may include an array of units of data (e.g., of DWORDs) in a given order. The command table generator 305 may rearrange the order of the array of the units of data to a modified order that includes the sequence (e.g., associated with the command indicated by the modification) and the respective sequences of commands already stored in the command table.

For example, the command table generator 305 may identify sequences associated with respective commands (e.g., including the command indicated by the modification) that are to be included in the command table. The command table generator 305 may determine whether the sequence of the command indicated by the modification can be represented by a combination of other sequences already included in the command table. For example, the modification may indicate that a command having the sequence of "DEF" is to be added to the command table. The command table may include an array of "FABCDE" for command sequences of "AB," "CDE," and "FAB." The command table generator 305 may identify that the sequence of "DEF" can be represented by a combination of the sequences "CDE" and "FAB" while also still including the sequence of "AB." Therefore, the command table generator 305 may rearrange the units of data (e.g., the DWORDS) to an array of "CDEFAB" such that the array includes the command sequences of "AB," "CDE," "FAB," and "DEF" without adding additional data to the command table (e.g., thereby not increasing a size of the command table). This may enable the size of the array of the command table to remain the same while also ensuring that sequences of each command to be included in the command table are still included in the array.

Additionally, or alternatively, the command table generator 305 may append at least a portion of the sequence indicated by the modification to the array such that the sequence is included in the array. For example, the command table generator 305 may append at least a portion of the sequence if the sequence is not already included in the array and/or cannot be represented by rearranging the order of the array. For example, the command table generator 305 may determine whether one or more units of data are included in a start or end of another sequence. Additionally, the command table generator 305 may determine whether a determined start or end of the other sequence is associated with representing a sequence via a combination of two sequences (e.g., the sequences of "ABC" and "DE" may be arranged as "ABCDE" to represent the sequence of "CD" such that the end of the sequence of "ABC" and the start of the sequence of "DE" are associated with representing a sequence via a combination).

If the command table generator 305 determines that the determined start or end of the other sequence is not associated with representing a sequence via a combination of two sequences, then the command table generator 305 may append a portion of the sequence that is not included in the determined start or end of the other sequence. For example, if the sequence to be added to the command table is "DEF" and a sequence of "ABCDE" is already included in the command table, then the command table generator may only add the unit of data of "F" at the end of the sequence of "ABCDE." This may result in a sequence of ""ABCDEF" which is capable of representing both the sequence of "ABCDE" and the sequence of "DEF."

If the command table generator 305 determines that there are no starts or ends of other sequences that include common units of data with the sequence to be added to the command table and that are not associated with representing a sequence via a combination of two sequences, then the command table generator 305 may append the entire sequence to the array of the command table generator 305. In other words, the command table generator 305 may add or append the full sequence to the array of the command table only if the command table generator 305 is unable to represent the full sequence via rearranging an order of the array or adding only a portion of the sequence, as described elsewhere herein.

As a result, the command table generator 305 may be configured to generate a smallest possible array of units of data (e.g., a smallest possible array of DWORDs) to represent sequences for all commands to be included in the command table when generating the command table and/or when adding a new command to the command table. This conserves memory resources associated with the memory device 120 that would have otherwise been used to store a larger command table.

As another example, the modification indicated by the client device 310 may include removing a command from the command table. The command table generator 305 may remove an entry associated with the command from the one or more entries included in the command table. For example, the command table generator 305 may determine whether a sequence of one or more units of data associated with the command is included in a sequence of another command indicated by the command table. The command table generator 305 may modify the command table to remove an indication of the command based on determining whether the second sequence of one or more units of data is included in a sequence of another command indicated by the command table.

For example, as shown by reference number 345, the command table generator 305 may selectively remove units of data for the command to be removed from the command table. For example, the command table generator 305 may remove the sequence of one or more units of data from the array based on determining that the sequence of one or more units of data is not included in the sequence of any other command indicated by the command table. For example, the command table generator 305 may remove units of data, for the sequence of the command to be removed from the command table, that are not included in the sequence of any other command indicated by the command table. As an example, the command to be removed may be associated with a sequence of "DEF" and the command table may be associated with an array of "ABCDEF" for command sequences of "AB," "DEF," and "CD." The command table generator 305 may determine that the unit of data of "D" from the sequence of "DEF" is being used to indicate another command that is to remain in the command table (e.g., is being used for the command sequence of "CD"). Therefore, the command table generator 305 may remove the units of data of "EF," resulting in an array of "ABCD" for the remaining command sequences of "AB," and "CD." In other words, the command table generator 305 may refrain from removing a portion of (or all of) the sequence of one or more units of data from the array based on determining that the portion of (or all of) the sequence of one or more units of data is included in a sequence of another command indicated by the command table.

In some implementations, the command table generator 305 may modify the command table to cause a sequence of each command to begin at an even index value included in the array. For example, the memory device 120 may be associated with hardware that is only capable of reading sequences that begin at an even index value. Therefore, in some cases, the command table generator 305 may modify the command table to cause a sequence of each command to begin at an even index value included in the array (e.g., even if the modification results in a larger array). For example, a command sequence of "AB" and a command sequence of "BC" could be represented by three units of data (e.g., of "ABC"). However, this would result in the command sequence of "BC" beginning at an odd index value (e.g., of 1). Therefore, the command table generator 305 may modify the command table to result in a command sequence of "ABBC" such that each command sequence begins at an even index value.

As shown by reference number 350, the command table generator 305 may store indications (e.g., index values and lengths) of locations of commands in the command table. For example, the command table generator 305 may store an indication of the commands included in the command table via respective index values and lengths after modifying the command table. For example, each location in the array may be associated with an index value. The command table generator 305 may store a mapping between an identifier of a command and a current index value associated with the command. For example, as the command table is rearranged and/or modified, a location of a sequence for a given command in the array of the command table may change. Therefore, the respective index values and lengths indicate respective locations of the one or more commands and the first command in the array. This may enable a firmware component of the memory device 120 to provide the same identifiers for commands while also enabling the controller 130 of the memory device to locate the sequence for the command in the command table (e.g., which may change over time).

As shown by reference number 355, the command table generator 305 may provide or transmit, and the memory device 120 may obtain or receive, an indication of the command table. For example, the command table generator 305 may provide or transmit, and the controller 130 may obtain or receive, the command table. For example, the command table generator 305 may provide the array of the command table to the memory device 120 and/or the controller 130. The memory device 120 and/or the controller 130 may store the command table. The memory device 120 and/or the controller 130 may access the command table to validate and/or identify information associated with commands provided to the memory device 120, as described in more detail elsewhere herein.

As indicated above, FIGS. 3A and 3B are provided as examples. Other examples may differ from what is described with regard to FIGS. 3A and 3B.

Figure 4:
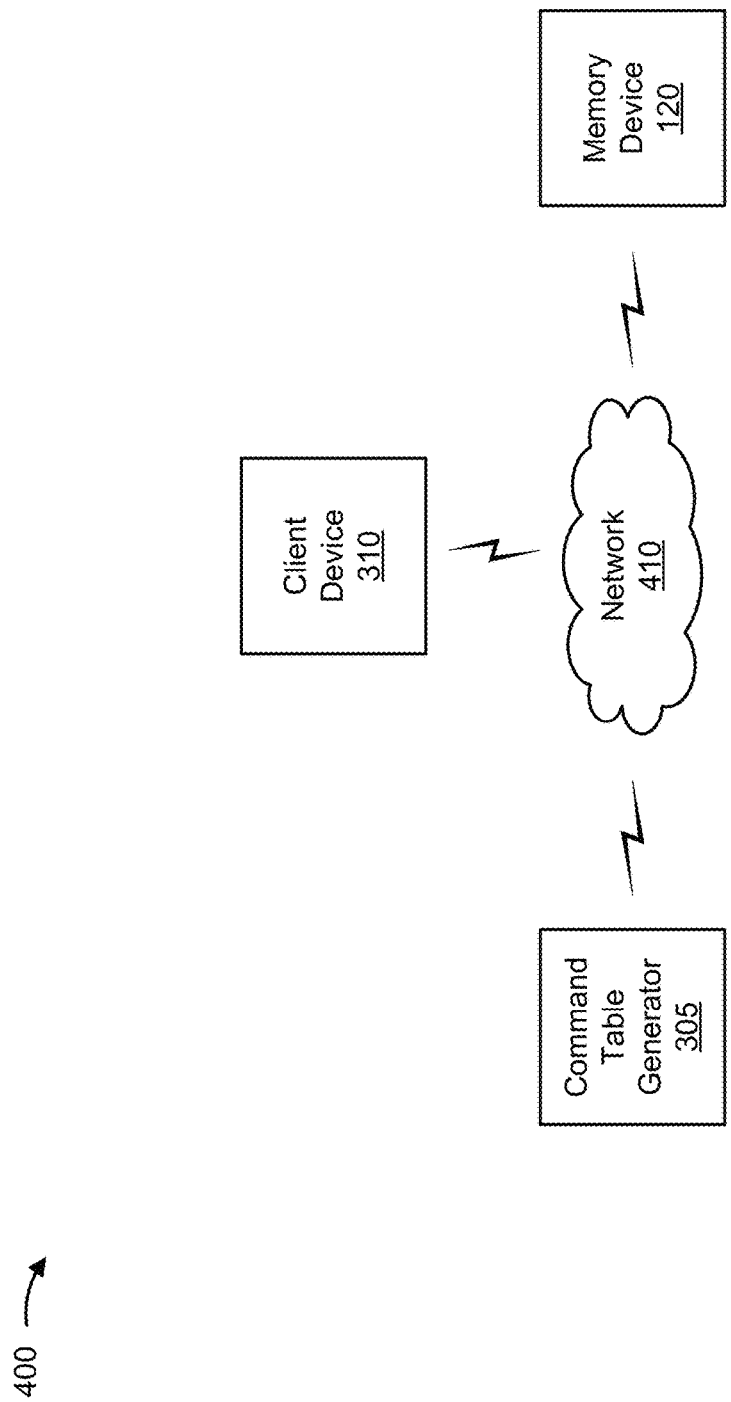
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include the command table generator 305, the client device 310, the memory device 120, a network 410. Devices of environment 400 may interconnect via wired connections, wireless connections, or a combination of wired and wireless connections. The memory device 120 is described in more detail in connection with FIGS. 1 and 2.

The command table generator 305 may include one or more devices capable of receiving, generating, storing, processing, providing, and/or routing information associated with generating and/or modifying a command table for the memory device 120, as described elsewhere herein. The command table generator 305 may include a communication device and/or a computing device. For example, the command table generator 305 may include a server, such as an application server, a client server, a web server, a database server, a host server, a proxy server, a virtual server (e.g., executing on computing hardware), or a server in a cloud computing system. In some implementations, the command table generator 305 may include computing hardware used in a cloud computing environment. In some implementations, the command table generator 305 may be a component of the memory device 120. In other examples, the command table generator 305 may be a separate device from the memory device 120.

The client device 310 may include one or more devices capable of receiving, generating, storing, processing, and/or providing information associated with generating and/or modifying a command table for the memory device 120, as described elsewhere herein. The client device 310 may include a communication device and/or a computing device. For example, the client device 310 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 410 may include one or more wired and/or wireless networks. For example, the network 410 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 410 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
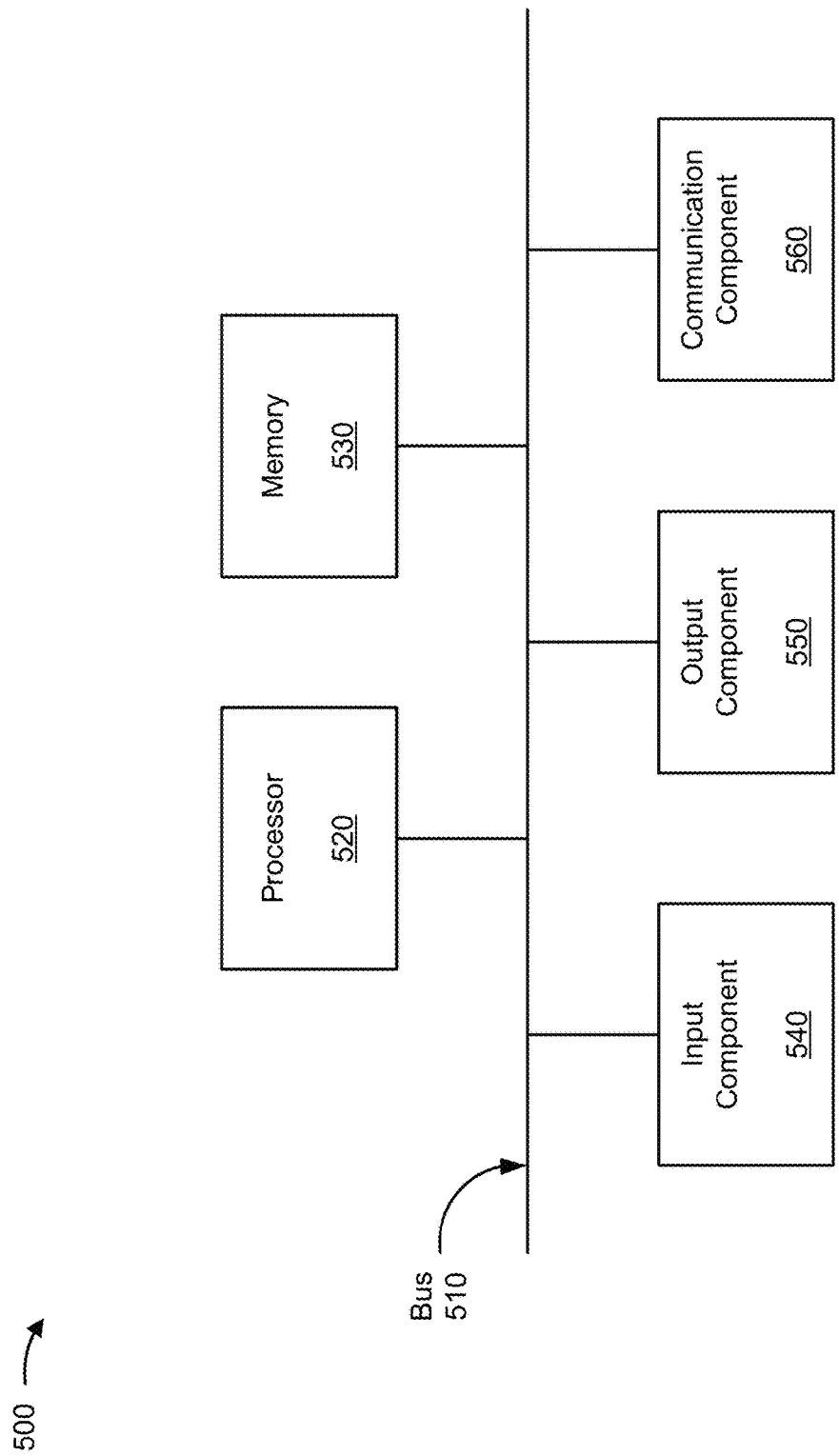
FIG. 5 is a diagram of example components of a device capable of generating and/or storing a command table for a memory device.

FIG. 5 is a diagram of example components of a device 500 capable of generating and/or storing a command table for a memory device. The device 500 may correspond to the command table generator 305 and/or the client device 310, among other examples. In some implementations, the command table generator 305 and/or the client device 310, among other examples, may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
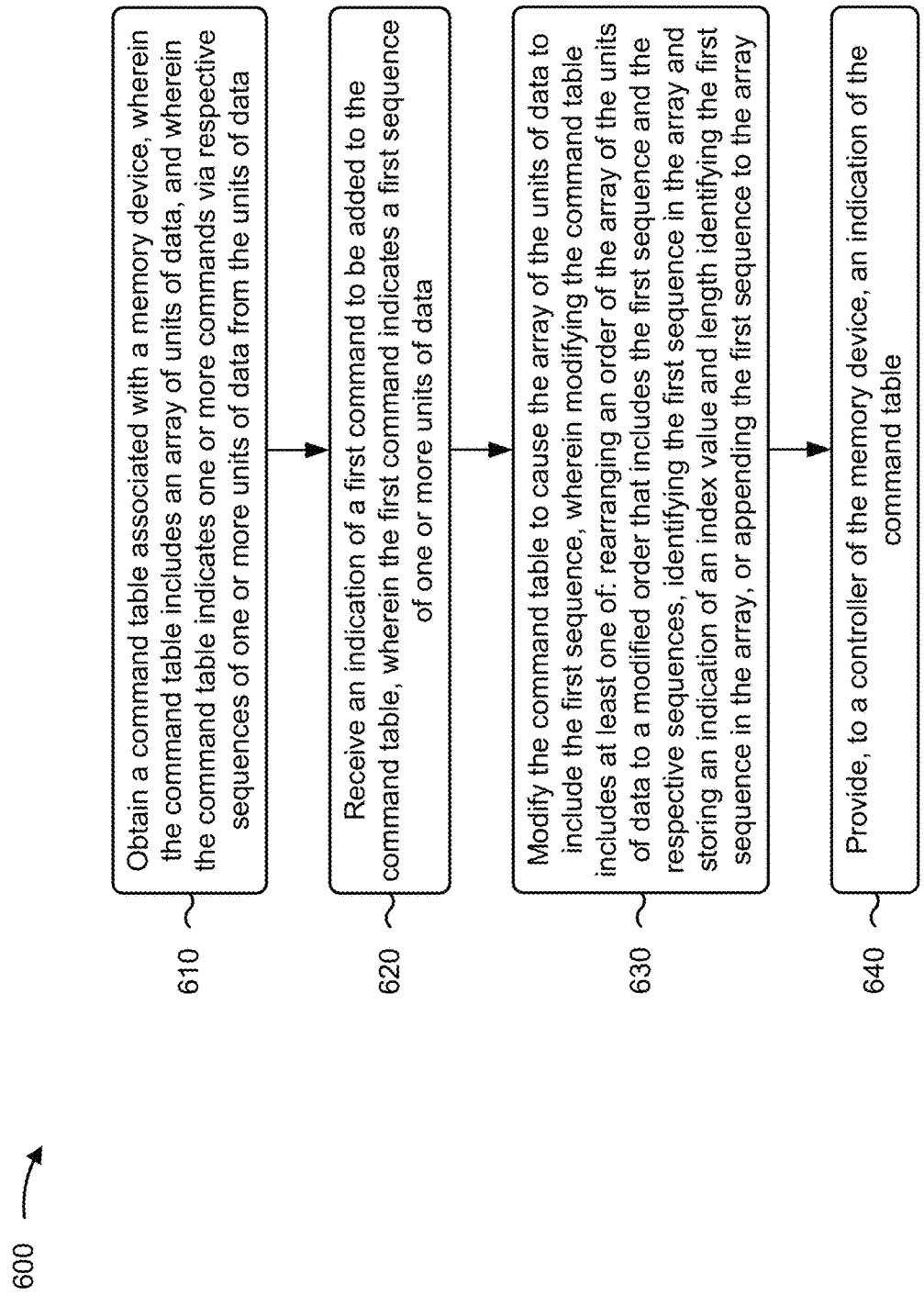
FIG. 6 is a flowchart of an example method associated with a command table generator for a memory device.

FIG. 6 is a flowchart of an example method 600 associated with a command table generator for a memory device. In some implementations, a command table generator (e.g., the command table generator 305) may perform or may be configured to perform the method 600. In some implementations, another device or a group of devices separate from or including the command table generator (e.g., the client device 310 and/or the memory device 120) may perform or may be configured to perform the method 600. Additionally, or alternatively, one or more components of the command table generator (e.g., the processor 520, the memory 530, the input component 540, the output component 550, and/or the communication component 560) may perform or may be configured to perform the method 600. Thus, means for performing the method 600 may include the command table generator and/or one or more components of the command table generator. Additionally, or alternatively, a non-transitory computer-readable medium may store one or more instructions that, when executed by the command table generator, cause the command table generator to perform the method 600.

As shown in FIG. 6, the method 600 may include obtaining a command table associated with a memory device, wherein the command table includes an array of units of data, and wherein the command table indicates one or more commands via respective sequences of one or more units of data from the units of data (block 610). As further shown in FIG. 6, the method 600 may include receiving an indication of a first command to be added to the command table, wherein the first command indicates a first sequence of one or more units of data (block 620). As further shown in FIG. 6, the method 600 may include modifying the command table to cause the array of the units of data to include the first sequence, wherein modifying the command table includes at least one of: rearranging an order of the array of the units of data to a modified order that includes the first sequence and the respective sequences, identifying the first sequence in the array and storing an indication of an index value and length identifying the first sequence in the array, or appending the first sequence to the array (block 630). As further shown in FIG. 6, the method 600 may include providing, to a controller of the memory device, an indication of the command table (block 640).

The method 600 may include additional aspects, such as any single aspect or any combination of aspects described below and/or described in connection with one or more other methods or operations described elsewhere herein.

In a first aspect, the method 600 includes modifying the array of the units of data to generate a smallest array that includes the respective sequences and the first sequence.

In a second aspect, alone or in combination with the first aspect, the method 600 includes receiving an indication of a second command to be removed from the command table, wherein the second command indicates a second sequence of one or more units of data, determining whether the second sequence of one or more units of data is included in a sequence of any other command indicated by the command table, and modifying the command table to remove an indication of the second command based on determining whether the second sequence of one or more units of data is included in a sequence of any other command indicated by the command table.

In a third aspect, alone or in combination with one or more of the first and second aspects, the method 600 includes removing the second sequence of one or more units of data from the array based on determining that the second sequence of one or more units of data is not included in the sequence of any other command indicated by the command table, or refraining from removing the second sequence of one or more units of data from the array based on determining that the second sequence of one or more units of data is included in a sequence of another command indicated by the command table.

In a fourth aspect, alone or in combination with one or more of the first through third aspects, the method 600 includes storing an indication of the one or more commands and the first command via respective index values and lengths after modifying the command table, wherein the respective index values and lengths indicate respective locations of the one or more commands and the first command in the array.

In a fifth aspect, alone or in combination with one or more of the first through fourth aspects, the method 600 includes receiving an indication of a quantity of repetitions associated with the first sequence that are to be included in the first command, and modifying the array of the units of data to cause the array to indicate the quantity of repetitions of the first sequence.

In a sixth aspect, alone or in combination with one or more of the first through fifth aspects, the method 600 includes modifying the command table to cause the first sequence to begin at an even index value included in the array.

In a seventh aspect, alone or in combination with one or more of the first through sixth aspects, the method 600 includes generating display information associated with a user interface by converting information associated with the command table from a first format associated with modifying the command table to a second format associated with the user interface, and providing, to a client device, the display information to cause the user interface to display the information in the second format.

In an eighth aspect, alone or in combination with one or more of the first through seventh aspects, the first format includes a Python programming language format and the second format includes a CSV format.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

Figure 7:
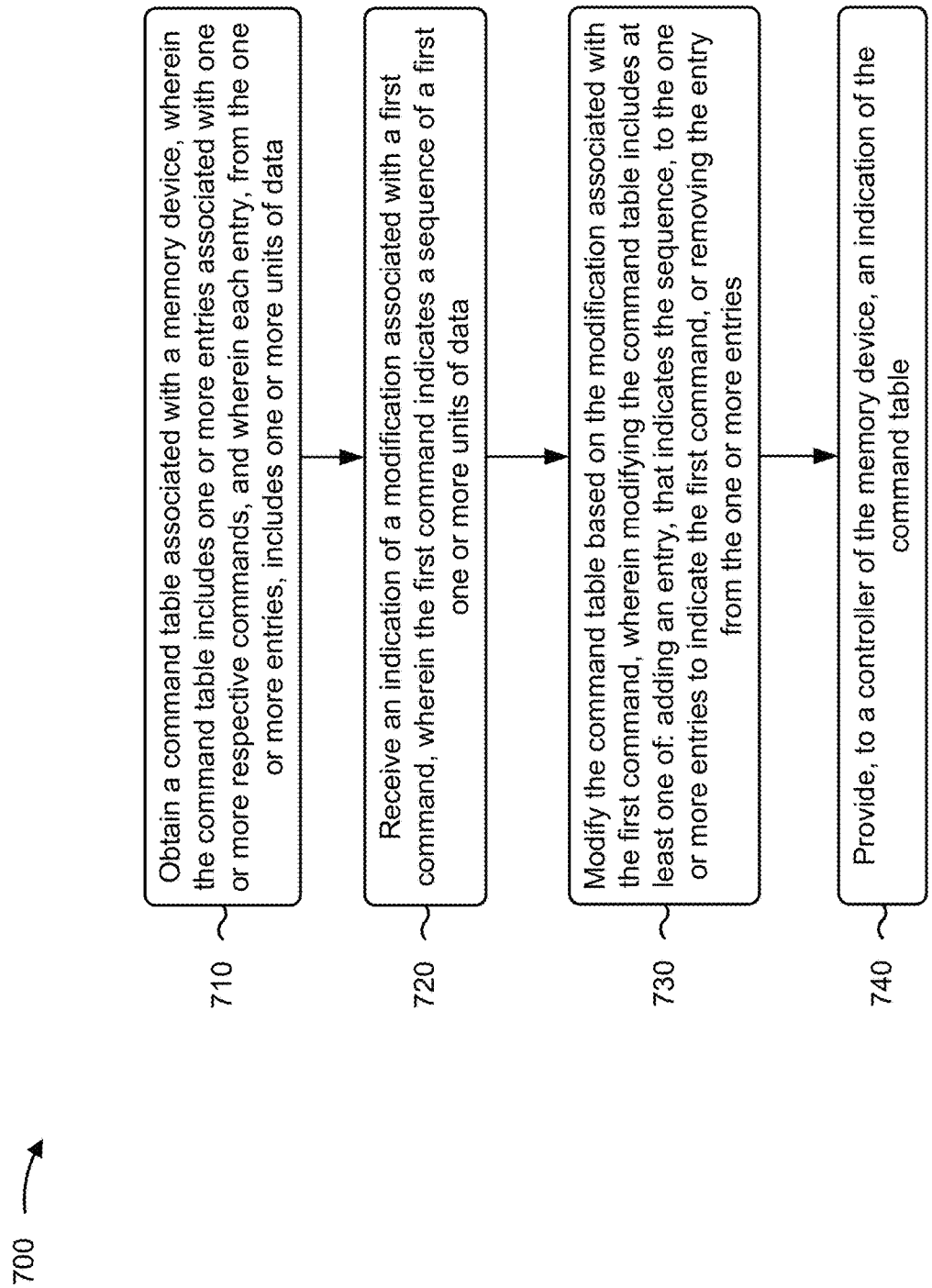
FIG. 7 is a flowchart of an example method associated with a command table generator for a memory device.

FIG. 7 is a flowchart of an example method 700 associated with a command table generator for a memory device. In some implementations, a command table generator (e.g., the command table generator 305) may perform or may be configured to perform the method 700. In some implementations, another device or a group of devices separate from or including the command table generator (e.g., the client device 310 and/or the memory device 120) may perform or may be configured to perform the method 700. Additionally, or alternatively, one or more components of the command table generator (e.g., the processor 520, the memory 530, the input component 540, the output component 550, and/or the communication component 560) may perform or may be configured to perform the method 700. Thus, means for performing the method 700 may include the command table generator and/or one or more components of the command table generator. Additionally, or alternatively, a non-transitory computer-readable medium may store one or more instructions that, when executed by the command table generator, cause the command table generator to perform the method 700.

As shown in FIG. 7, the method 700 may include obtaining a command table associated with a memory device, wherein the command table includes one or more entries associated with one or more respective commands, and wherein each entry, from the one or more entries, includes one or more units of data (block 710). As further shown in FIG. 7, the method 700 may include receiving an indication of a modification associated with a first command, wherein the first command indicates a sequence of a first one or more units of data (block 720). As further shown in FIG. 7, the method 700 may include modifying the command table based on the modification associated with the first command, wherein modifying the command table includes at least one of: adding an entry, that indicates the sequence, to the one or more entries to indicate the first command, or removing the entry from the one or more entries (block 730). As further shown in FIG. 7, the method 700 may include providing, to a controller of the memory device, an indication of the command table (block 740).

The method 700 may include additional aspects, such as any single aspect or any combination of aspects described below and/or described in connection with one or more other methods or operations described elsewhere herein.

In a first aspect, adding the entry, that indicates the sequence, to the one or more entries to indicate the first command comprises rearranging an order of the one or more entries to a modified order that includes the sequence and sequences of the one or more respective commands, identifying the sequence in the one or more entries and storing an indication of an index value and length in the command table identifying the entry, or adding the entry to the one or more entries by appending the sequence to the command table.

In a second aspect, alone or in combination with the first aspect, removing the entry from the one or more entries comprises determining whether the sequence of the first one or more units of data is included in a sequence of any other command indicated by the command table, and modifying the command table to remove an indication of the first command by removing the first one or more units of data from the command table based on determining that the sequence is not included in the sequence of any other command indicated by the command table, or refraining from removing the first one or more units of data from the command table based on determining that the sequence is included in the sequence of any other command indicated by the command table.

In a third aspect, alone or in combination with one or more of the first and second aspects, receiving the indication of the modification associated with the first command comprises receiving the indication of the modification in a first programming language that is used by a firmware component of the controller of the memory device, extracting information from the indication of the modification in the first programming language, and converting the information into a second programming language that is used by the device to modify the command table.

In a fourth aspect, alone or in combination with one or more of the first through third aspects, receiving the indication of the modification associated with the first command comprises receiving an indication of differential information indicating the modification associated with the first command, wherein the differential information indicates different information between the first command and a second command associated with the command table.

In a fifth aspect, alone or in combination with one or more of the first through fourth aspects, the one or more units of data include one or more double words (DWORDs).

In a sixth aspect, alone or in combination with one or more of the first through fifth aspects, the command table is associated with a non-binary format, and the method 700 includes providing, to a client device, a user interface that enables the indication of the modification associated with the first command to be input using binary data.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
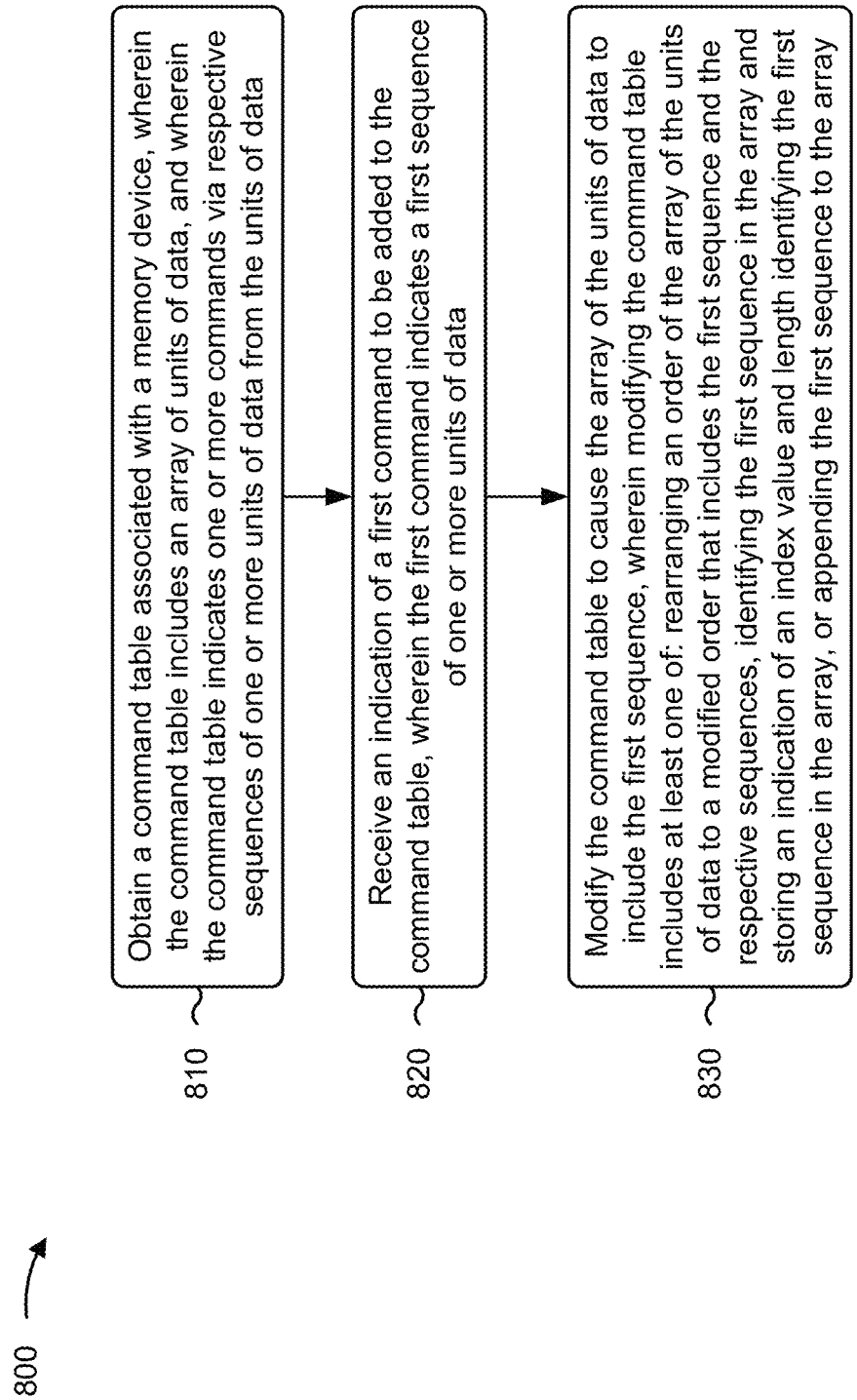
FIG. 8 is a flowchart of an example method associated with a command table generator for a memory device.

FIG. 8 is a flowchart of an example method 800 associated with a command table generator for a memory device. In some implementations, a command table generator (e.g., the command table generator 305) may perform or may be configured to perform the method 800. In some implementations, another device or a group of devices separate from or including the command table generator (e.g., the client device 310 and/or the memory device 120) may perform or may be configured to perform the method 800. Additionally, or alternatively, one or more components of the command table generator (e.g., the processor 520, the memory 530, the input component 540, the output component 550, and/or the communication component 560) may perform or may be configured to perform the method 800. Thus, means for performing the method 800 may include the command table generator and/or one or more components of the command table generator. Additionally, or alternatively, a non-transitory computer-readable medium may store one or more instructions that, when executed by the command table generator, cause the command table generator to perform the method 800.

As shown in FIG. 8, the method 800 may include obtaining a command table associated with a memory device, wherein the command table includes an array of units of data, and wherein the command table indicates one or more commands via respective sequences of one or more units of data from the units of data (block 810). As further shown in FIG. 8, the method 800 may include receiving an indication of a first command to be added to the command table, wherein the first command indicates a first sequence of one or more units of data (block 820). As further shown in FIG. 8, the method 800 may include modifying the command table to cause the array of the units of data to include the first sequence, wherein modifying the command table includes at least one of: rearranging an order of the array of the units of data to a modified order that includes the first sequence and the respective sequences, identifying the first sequence in the array and storing an indication of an index value and length identifying the first sequence in the array, or appending the first sequence to the array (block 830).

The method 800 may include additional aspects, such as any single aspect or any combination of aspects described below and/or described in connection with one or more other methods or operations described elsewhere herein.

In a first aspect, the method 800 includes providing, to a controller of the memory device, an indication of the command table.

In a second aspect, alone or in combination with the first aspect, modifying the command table includes modifying the array of the units of data to generate a smallest array that includes the respective sequences and the first sequence.

In a third aspect, alone or in combination with one or more of the first and second aspects, modifying the command table includes storing an indication of the one or more commands and the first command via respective index values and lengths after modifying the command table, wherein the respective index values and lengths indicate respective locations of the one or more commands and the first command in the array.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

In some implementations, a device includes one or more components configured to: obtain a command table associated with a memory device, wherein the command table includes an array of units of data, and wherein the command table indicates one or more commands via respective sequences of one or more units of data from the units of data; receive an indication of a first command to be added to the command table, wherein the first command indicates a first sequence of one or more units of data; modify the command table to cause the array of the units of data to include the first sequence, wherein modifying the command table includes at least one of: rearranging an order of the array of the units of data to a modified order that includes the first sequence and the respective sequences, identifying the first sequence in the array and storing an indication of an index value and length identifying the first sequence in the array, or appending the first sequence to the array; and provide, to a controller of the memory device, an indication of the command table.

In some implementations, a method includes obtaining, by a device, a command table associated with a memory device, wherein the command table includes one or more entries associated with one or more respective commands, and wherein each entry, from the one or more entries, includes one or more units of data; receiving, by the device, an indication of a modification associated with a first command, wherein the first command indicates a sequence of a first one or more units of data; modifying, by the device, the command table based on the modification associated with the first command, wherein modifying the command table includes at least one of: adding an entry, that indicates the sequence, to the one or more entries to indicate the first command, or removing the entry from the one or more entries; and providing, by the device and to a controller of the memory device, an indication of the command table.

In some implementations, an apparatus includes means for obtaining a command table associated with a memory device, wherein the command table includes an array of units of data, and wherein the command table indicates one or more commands via respective sequences of one or more units of data from the units of data; means for receiving an indication of a first command to be added to the command table, wherein the first command indicates a first sequence of one or more units of data; and means for modifying the command table to cause the array of the units of data to include the first sequence, wherein the means for modifying the command table includes at least one of: means for rearranging an order of the array of the units of data to a modified order that includes the first sequence and the respective sequences, means for identifying the first sequence in the array and storing an indication of an index value and length identifying the first sequence in the array, or means for appending the first sequence to the array.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more components configured to:
      obtain a command table associated with a memory device,
         wherein the command table includes an array of units of data, and
         wherein the command table indicates one or more commands via respective sequences of one or more units of data from the units of data;
      receive an indication of a first command to be added to the command table,
         wherein the first command indicates a first sequence of one or more units of data;
      modify the command table to cause the array of the units of data to include the first sequence, wherein modifying the command table includes at least one of:
         rearranging an order of the array of the units of data to a modified order that includes the first sequence and the respective sequences,
         identifying the first sequence in the array and storing an indication of an index value and length identifying the first sequence in the array, or
         appending the first sequence to the array; and
      provide, to a controller of the memory device, an indication of the command table.

2. The device of claim 1, wherein the one or more components, to modify the command table, are configured to:
   modify the array of the units of data to generate a smallest array that includes the respective sequences and the first sequence.

3. The device of claim 1, wherein the one or more components are further configured to:
   receive an indication of a second command to be removed from the command table,
      wherein the second command indicates a second sequence of one or more units of data;
   determine whether the second sequence of one or more units of data is included in a sequence of any other command indicated by the command table; and
   modify the command table to remove an indication of the second command based on determining whether the second sequence of one or more units of data is included in a sequence of any other command indicated by the command table.

4. The device of claim 3, wherein the one or more components, to modify the command table to remove an indication of the second command, are configured to:
   remove the second sequence of one or more units of data from the array based on determining that the second sequence of one or more units of data is not included in the sequence of any other command indicated by the command table; or
   refrain from removing the second sequence of one or more units of data from the array based on determining that the second sequence of one or more units of data is included in a sequence of another command indicated by the command table.

5. The device of claim 1, wherein the one or more components are further configured to:
store an indication of the one or more commands and the first command via respective index values and lengths after modifying the command table,
wherein the respective index values and lengths indicate respective locations of the one or more commands and the first command in the array.

6. The device of claim 1, wherein the one or more components, to receive the indication of the first command to be added to the command table, are configured to:
receive an indication of a quantity of repetitions associated with the first sequence that are to be included in the first command; and
wherein the one or more components, to modify the command table, are configured to:
modify the array of the units of data to cause the array to indicate the quantity of repetitions of the first sequence.

7. The device of claim 1, wherein the one or more components, to modify the command table, are configured to:
modify the command table to cause the first sequence to begin at an even index value included in the array.

8. The device of claim 1, wherein the one or more components are further configured to:
generate display information associated with a user interface by converting information associated with the command table from a first format associated with modifying the command table to a second format associated with the user interface; and
provide, to a client device, the display information to cause the user interface to display the information in the second format.

9. The device of claim 8, wherein the first format includes a Python programming language format and the second format includes a comma-separated values (CSV) format.

10. A method, comprising:
obtaining, by a device, a command table associated with a memory device,
wherein the command table includes one or more entries associated with one or more respective commands, and
wherein each entry, from the one or more entries, includes one or more units of data;
receiving, by the device, an indication of a modification associated with a first command,
wherein the first command indicates a sequence of a first one or more units of data;
modifying, by the device, the command table based on the modification associated with the first command,
wherein modifying the command table includes at least one of:
adding an entry, that indicates the sequence, to the one or more entries to indicate the first command, or
removing the entry from the one or more entries; and
providing, by the device and to a controller of the memory device, an indication of the command table.

11. The method of claim 10, wherein adding the entry, that indicates the sequence, to the one or more entries to indicate the first command comprises:
rearranging an order of the one or more entries to a modified order that includes the sequence and sequences of the one or more respective commands,
identifying the sequence in the one or more entries and storing an indication of an index value and length in the command table identifying the entry, or
adding the entry to the one or more entries by appending the sequence to the command table.

12. The method of claim 10, wherein removing the entry from the one or more entries comprises:
determining whether the sequence of the first one or more units of data is included in a sequence of any other command indicated by the command table; and
modifying the command table to remove an indication of the first command by:
removing the first one or more units of data from the command table based on determining that the sequence is not included in the sequence of any other command indicated by the command table; or
refraining from removing the first one or more units of data from the command table based on determining that the sequence is included in the sequence of any other command indicated by the command table.

13. The method of claim 10, wherein receiving the indication of the modification associated with the first command comprises:
receiving the indication of the modification in a first programming language that is used by a firmware component of the controller of the memory device;
extracting information from the indication of the modification in the first programming language; and
converting the information into a second programming language that is used by the device to modify the command table.

14. The method of claim 10, wherein receiving the indication of the modification associated with the first command comprises:
receiving an indication of differential information indicating the modification associated with the first command,
wherein the differential information indicates different information between the first command and a second command associated with the command table.

15. The method of claim 10, wherein the one or more units of data include one or more double words (DWORDs).

16. The method of claim 10, wherein the command table is associated with a non-binary format, and wherein the method further comprises:
providing, to a client device, a user interface that enables the indication of the modification associated with the first command to be input using binary data.

17. An apparatus, comprising:
means for obtaining a command table associated with a memory device,
wherein the command table includes an array of units of data, and
wherein the command table indicates one or more commands via respective sequences of one or more units of data from the units of data;
means for receiving an indication of a first command to be added to the command table,
wherein the first command indicates a first sequence of one or more units of data; and
means for modifying the command table to cause the array of the units of data to include the first sequence,
wherein the means for modifying the command table includes at least one of:
means for rearranging an order of the array of the units of data to a modified order that includes the first sequence and the respective sequences, means for identifying the first sequence in the array and storing an indication of an index value and length identifying the first sequence in the array, or means for appending the first sequence to the array.

18. The apparatus of claim 17, further comprising:
means for providing, to a controller of the memory device, an indication of the command table.

19. The apparatus of claim 17, wherein the means for modifying the command table includes:
means for modifying the array of the units of data to generate a smallest array that includes the respective sequences and the first sequence.

20. The apparatus of claim 17, wherein the means for modifying the command table includes:
means for storing an indication of the one or more commands and the first command via respective index values and lengths after modifying the command table, wherein the respective index values and lengths indicate respective locations of the one or more commands and the first command in the array.

* * * * *